United States Patent
Collotta et al.

(10) Patent No.: US 8,494,849 B2
(45) Date of Patent: Jul. 23, 2013

(54) METHOD AND APPARATUS FOR TRANSMITTING SPEECH DATA TO A REMOTE DEVICE IN A DISTRIBUTED SPEECH RECOGNITION SYSTEM

(75) Inventors: Ivano Salvatore Collotta, Turin (IT); Donato Ettorre, Turin (IT); Maurizio Fodrini, Turin (IT); Pierluigi Gallo, Pisa (IT); Roberto Spagnolo, Veglie (IT)

(73) Assignee: Telecom Italia S.p.A., Milan (IT)

(*) Notice: Subject to any disclaimer, the term of this patent is extended or adjusted under 35 U.S.C. 154(b) by 849 days.

(21) Appl. No.: 11/922,500

(22) PCT Filed: Jun. 20, 2005

(86) PCT No.: PCT/EP2005/006581
§ 371 (c)(1),
(2), (4) Date: Apr. 1, 2009

(87) PCT Pub. No.: WO2006/136179
PCT Pub. Date: Dec. 28, 2006

(65) Prior Publication Data
US 2009/0222263 A1    Sep. 3, 2009

(51) Int. Cl.
*G10L 15/20* (2006.01)
(52) U.S. Cl.
USPC ........... 704/233; 704/216; 704/211; 704/208; 704/266; 704/258; 704/253; 704/245; 704/223; 704/222; 704/221; 704/220; 704/219; 379/269; 375/368; 375/317; 375/219; 370/528; 370/462; 370/347; 370/315; 84/622; 84/609
(58) Field of Classification Search
USPC ................. 704/216, 233, 462, 220, 266, 258, 704/253, 245, 223, 222, 221, 219, 211, 208; 370/528, 462, 347, 315; 379/269; 375/369, 375/317, 219; 84/622, 609
See application file for complete search history.

(56) References Cited

U.S. PATENT DOCUMENTS 4,307,461 A * 12/1981 Brickman et al. ............ 379/269
4,813,040 A *  3/1989 Futato ........................ 370/528
(Continued)

FOREIGN PATENT DOCUMENTS

EP       1 265 224 A1    12/2002
WO    WO 02/103679 A1    12/2002

OTHER PUBLICATIONS

ETSI ES 202 212 v1.1.1, "Speech Processing, Transmission and Quality Aspects (STQ); Distributed Speech Recognition; Extended Advanced Front-End Feature Extraction Algorithm;Compression Algorithms; Back-End Speech Reconstruction Algorithm," http://www.etsi.org, ETSI Standard, pp. 1-93, (Nov. 2003).

*Primary Examiner* — Michael Colucci
(74) *Attorney, Agent, or Firm* — Finnegan, Henderson, Farabow, Garrett & Dunner, L.L.P.

(57) ABSTRACT

A method of transmitting speech data to a remote device in a distributed speech recognition system, includes the steps of: dividing an input speech signal into frames; calculating, for each frame, a voice activity value representative of the presence of speech activity in the frame; grouping the frames into multiframes, each multiframe including a predetermined number of frames; calculating, for each multiframe, a voice activity marker representative of the number of frames in the multiframe representing speech activity; and selectively transmitting, on the basis of the voice activity marker associated with each multiframe, the multiframes to the remote device.

17 Claims, 3 Drawing Sheets

U.S. PATENT DOCUMENTS

| | | | | |
|---|---|---|---|---|
| 5,008,941 A * | 4/1991 | Sejnoha | | 704/222 |
| 5,574,823 A * | 11/1996 | Hassanein et al. | | 704/208 |
| 5,600,679 A * | 2/1997 | Kadowaki et al. | | 375/317 |
| 5,680,421 A * | 10/1997 | Shiino et al. | | 375/368 |
| 5,808,225 A * | 9/1998 | Corwin et al. | | 84/622 |
| 5,828,994 A * | 10/1998 | Covell et al. | | 704/211 |
| 5,930,295 A * | 7/1999 | Isley et al. | | 375/219 |
| 5,959,984 A * | 9/1999 | Dent | | 370/347 |
| 5,960,389 A * | 9/1999 | Jarvinen et al. | | 704/220 |
| 6,041,297 A * | 3/2000 | Goldberg | | 704/219 |
| 6,424,938 B1 * | 7/2002 | Johansson et al. | | 704/216 |
| 6,535,521 B1 * | 3/2003 | Barghouti et al. | | 370/462 |
| 6,678,654 B2 * | 1/2004 | Zinser et al. | | 704/221 |
| 6,678,655 B2 * | 1/2004 | Hoory et al. | | 704/223 |
| 6,836,761 B1 * | 12/2004 | Kawashima et al. | | 704/258 |
| 6,873,953 B1 * | 3/2005 | Lennig | | 704/253 |
| 7,363,218 B2 * | 4/2008 | Jabri et al. | | 704/221 |
| 7,411,919 B2 * | 8/2008 | Tavli et al. | | 370/315 |
| 2002/0120440 A1 | 8/2002 | Zhang | | |
| 2002/0188445 A1 * | 12/2002 | Li | | 704/233 |
| 2003/0236663 A1 * | 12/2003 | Dimitrova et al. | | 704/245 |
| 2004/0030544 A1 | 2/2004 | Ramabadran | | |
| 2005/0256701 A1 * | 11/2005 | Makinen | | 704/223 |
| 2006/0080090 A1 * | 4/2006 | Ramo et al. | | 704/222 |
| 2007/0163425 A1 * | 7/2007 | Tsui et al. | | 84/609 |
| 2008/0201150 A1 * | 8/2008 | Tamura et al. | | 704/266 |

* cited by examiner

METHOD AND APPARATUS FOR TRANSMITTING SPEECH DATA TO A REMOTE DEVICE IN A DISTRIBUTED SPEECH RECOGNITION SYSTEM

CROSS REFERENCE TO RELATED APPLICATION

This application is a national phase application based on PCT/EP2005/006581, filed Jun. 20, 2005, the content of which is incorporated herein by reference.

FIELD OF THE INVENTION

The present invention relates in general to speech recognition systems distributed over a communications network, and in particular to a method and an apparatus for optimising the transmission of speech data to a remote device in a distributed speech recognition system.

The invention has been developed with particular attention paid to its possible use in wireless telecommunications networks, for providing efficient transmission of information between a mobile terminal and a server of a distributed speech recognition system.

DESCRIPTION OF THE RELATED ART

A distributed speech recognition (DSR) system comprises a front-end module, integrated in a mobile station, for performing processing of speech signal, and a back-end module, located on the server side, that carries out the recognition on the speech signal previously elaborated. In particular the front-end module extracts characteristic speech parameters (feature extraction) from an input speech signal previously subdivided in frames and digitally sampled, and transmits such parameters to the back-end which performs the last steps of recognition process. The speech is not sent over a voice channel, but only a coded parametric representation of the speech is sent over an error protected data channel. In this way, errors typical of voice channel, such as for example errors due to the double transcoding function, are avoided.

As used herein, "frame" is meant to designate, in general, a portion of the input speech signal having a duration, e.g. 10 or 20 ms, suitable for extracting spectral parameters describing the voice spectrum of the frame. The term "multiframe" refers to a plurality of consecutive frames, for example a predefined number N of frames corresponding to the smallest transmission unit transferred from the front-end to the back-end, e.g. 24 frames.

After feature extraction, parameters related to whole input speech are formatted in a bitstream and transmitted over the communication channel. The bitstream contains both useful information (voice activity region) and background noise (also including other voices).

A distributed speech recognition system is illustrated in the ETSI Standard known as "Aurora", ETSI ES 202.212, v. 1.1.1, 11-2.003, "Speech processing, transmission and quality aspects (STQ); Distributed speech recognition; Extended advanced front-end feature extraction algorithm; Compression algorithms", available on the Internet at the address "http://www.etsi.org". The front-end module defined in such standard provides that a voice activity detection (VAD) flag representative of the presence of speech in a speech frame is calculated by means of a procedure, called "VADNest", for each frame of the speech signal. The output of this procedure is a flag whose value is set to one if voice activity is detected and zero otherwise. In the same document a second procedure of the front-end module is disclosed, capable of calculating, frame by frame, the energy of the speech signal, and generating, for each frame, a Frame Energy parameter representative of the associated energy.

The Applicant has observed that voice activity evaluation performed in the Aurora front-end by means of the VAD flag, as well as the Frame Energy parameter, reveals a high variability of the input speech signal, because such parameters are computed for every frame (i.e. every 10 or 20 ms).

A method for distinguishing voice activity regions from silence or noise regions in an input voice signal is illustrated in document EP 1 265 224, which discloses a voice activity detection system that extracts the energy of a signal, computes an estimation of noise and decides a threshold that is used in voice activity decision.

Document WO 02/103679 illustrates a method and an apparatus for transmitting voice activity in a distributed speech recognition system. A local voice recognition engine on a terminal comprises a feature extraction module that extracts features from a speech signal, and a voice activity detection VAD module that detects voice activity within the speech signal. The combined results from the VAD module and feature extraction module are provided to a remote server in the form of advanced front end features, thereby enabling the server to process speech segments free of silence regions.

The Applicant has tackled the problem of computing reliable and efficient activity information at low computational cost, using parameters available in a standard front-end module. In particular, the Applicant has observed that the bitstream obtained combining voice activity detection information computed according to the above mentioned prior art methods with speech data would result too fragmented and it would be unlikely recognized correctly by a back-end recognition server.

OBJECT AND SUMMARY OF THE INVENTION

In this perspective, in order to decrease the size of the transmitted data as well as to maintain high recognition performance, there is a need for a method of elaborating the VADNest flags by means of a windowing function, thus providing an efficient separation between voiced and unvoiced segments of the input signal.

The Applicant has found that this problem can be solved by grouping the frames of the input speech signal into multiframes, each multiframe comprising, in case of 10 ms frames, a number of frames preferably between 10 and 40, e.g. 24 frames, marking each multiframe with a voice activity marker, computed taking into account a voice activity parameter (e.g. VAD parameter) of each frame, and selecting the transmission of the sole multiframes having the voice activity marker set.

As regards the length of the multiframe, it is preferable to set such length so as to comprise a portion of the speech signal having a duration greater than the duration of a single frame, e.g. at least ten times such duration, in order to avoid uncontrolled variability of the speech signal, and not longer than a few tens of the duration of a frame in order to maintain sufficient variability information.

A particular object of the present invention is to provide a method of transmitting speech data to a remote device, comprising:
dividing an input speech signal into frames;
calculating, for each frame, a voice activity value representative of the presence of speech activity in said frame;
grouping said frames into multiframes, each multiframe comprising a predetermined number of frames;

calculating, for each multiframe, a voice activity marker representative of the number of frames in said multiframe representing speech activity; and selectively transmitting, on the basis of said voice activity marker associated to each multiframe, said multiframes to said remote device.

According to the present invention, that object is achieved by means of a method having the features set forth in the claims that follow. The invention also relates to a corresponding system as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

Further features and advantages of the present invention will be made clearer by the following detailed description of some examples thereof, provided purely by way of example and without restrictive intent. The detailed description will refer to the following figures, in which.

Figure 1:
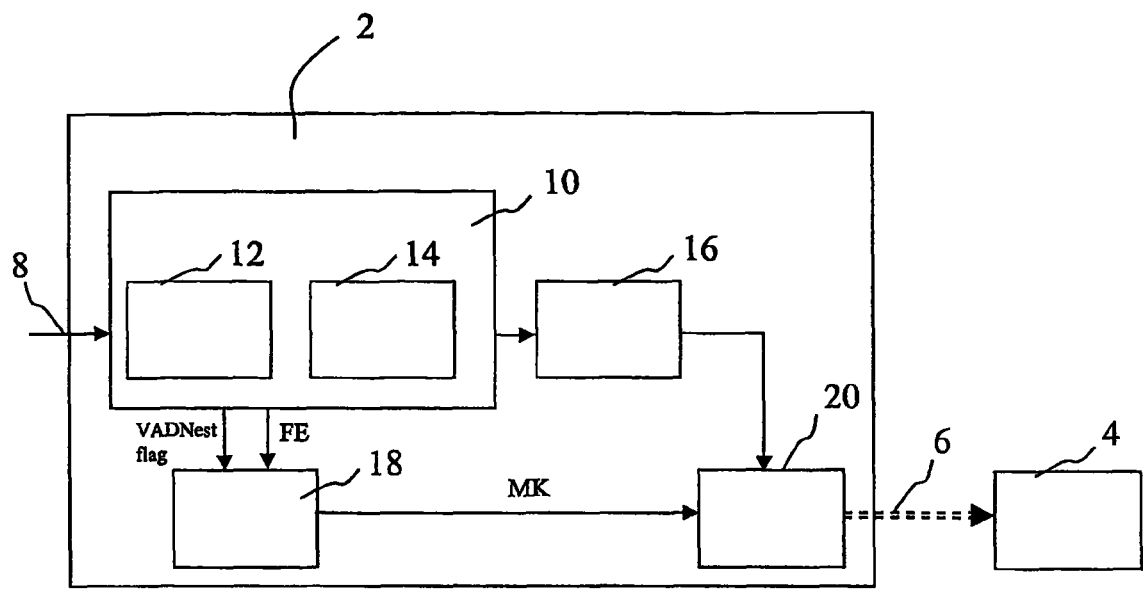
FIG. 1 shows a block diagram of a distributed speech recognition system realised according to the present invention.

With reference to FIG. 1, a distributed speech recognition system comprises a front-end module 2, generally embedded into a mobile terminal, and a back-end module 4 located in a remote server. The mobile terminal is connected to the remote server through a communications network, schematically represented by the arrow 6 in FIG. 1, such as for example a cellular network.

Front-end module 2 processes an input speech signal 8, e.g. a voice signal received from the microphone of a mobile phone, in order to provide a parametric representation of the voice signal, while the back-end module 4 carries out the recognition on the speech signal previously elaborated by the front-end. The front-end comprises a feature extraction block 10, a bitstream formatting block 16, a marker 18 and a decision block 20, whose operation will be described in detail hereinafter.

The input signal 8 enters the feature extraction block 10 wherein it is divided into frames (e.g. 10 ms frames) and filtered by a noise reduction block 12. In order to perform the noise segregation, this block evaluates, frame by frame, the voice activity using a VAD (Voice Activity Detection) algorithm, such as the so-called VADNest algorithm defined by the above mentioned "Aurora" standard, ETSI ES 202.212. The output of this block is a VAD flag, also called VADNest flag, whose value is set to "1" if voice activity is detected and "0" otherwise. The voice activity evaluation made by block 10 reveals a high variability in the input speech signal, because the VAD flag is computed every frame of 10 ms.

The noise reduction process 12 is followed by a feature analysis block 14, wherein a set of spectral parameters characteristic of the voice spectrum of each frame are extracted. The bitstream formatting block 16 arranges the compressed feature vectors with respect to the specific frame structure used, for example generating sequences of 24 frames, each sequence of frames being called multiframe. The multiframe is therefore the smallest transmission unit transferred from the front-end to the back-end, and comprises generally a predefined number N of frames (e.g 24 frames).

Besides computation of the VADNest flag, the feature extraction block 10 performs an estimation of the signal energy, computed frame-by-frame (every 10 ms), and generates a so-called Frame Energy signal, referred to as FE in FIG. 1. Generation of the frame energy signal is made according to the Frame Energy algorithm defined by the above mentioned "Aurora" standard, ETSI ES 202.212.

According to the invention, a marker block 18 receives the information relative to the VADNest flag and the Frame Energy signal, relative to each frame, and performs a processing, described in detail hereinafter, in order to generate a marker MK which selects, through a decision block 20, the portions of the input speech signal that do not contain speech information, avoiding transmission of the corresponding multiframes, thus reducing the bitstream sent to the back-end module through the communications network 6.

The decision block 20 therefore eliminates the bitstream regions which correspond to the rejected multiframes, allowing an optimisation of radio resources by means of a reduction of the transmitted traffic. The multiframe counter is updated accordingly, in order to provide the back-end with a coherent bitstream.

The marker block 18 is capable of performing two different processing operations, corresponding to the two parameters generated by the front-end, VADNest flag and Frame Energy. The two processing operations are alternative to each other, and correspond to different conditions of the input speech signal. The system switches between the two operations according to a preliminary analysis of the background noise, schematically shown in the flow diagram of FIG. 2.

A simplified version of the system is however feasible, wherein only the VADNest flag parameter is processed and the preliminary analysis performed on the background noise is avoided.

Figure 2:
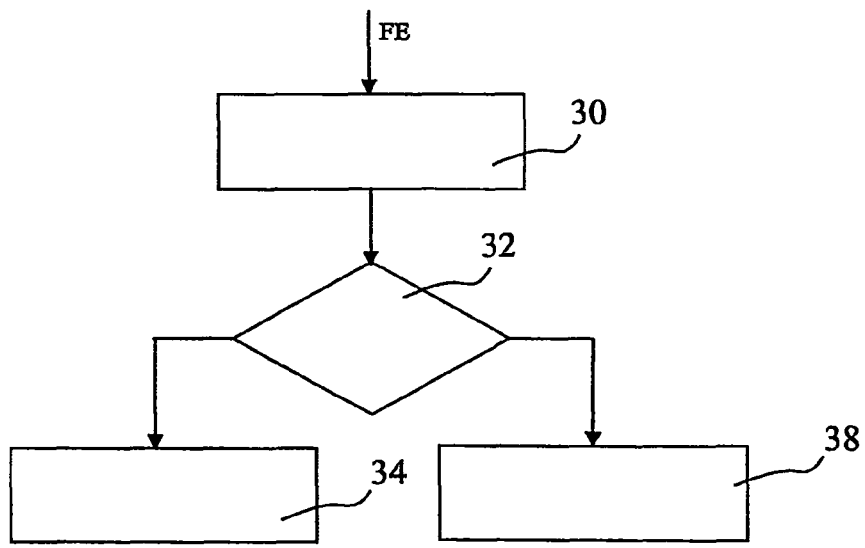
FIG. 2 shows a flow diagram of a preliminary analysis performed on an input speech signal, according to the present invention.

As shown in FIG. 2, a background noise average energy is computed taking into account the Frame Energy signal FE, in block 30, according to the following procedure. Starting from the assumption that the voice activity is not present in the first frames but only background noise, an average of the Frame Energy parameters corresponding to these frames is computed. The average is performed over a range of several frames, on a corresponding window comprising for example two consecutive multiframes, i.e. 48 frames (corresponding to a duration of 480 ms).

In a decision block 32 the background noise average energy is compared with a predetermined background noise energy threshold. If the background noise average energy is below the threshold, corresponding to normal noise conditions, a VADNest processing 34 is performed for the current multiframe. If the background noise average energy is over the threshold, corresponding to strong noise conditions, an alternative energy processing 38, described in detail hereinafter, is performed for the current multiframe.

The VADNest processing 34 will be described in detail hereinafter, with particular reference to FIGS. 3, 4, 5 and 6.

Figure 3:
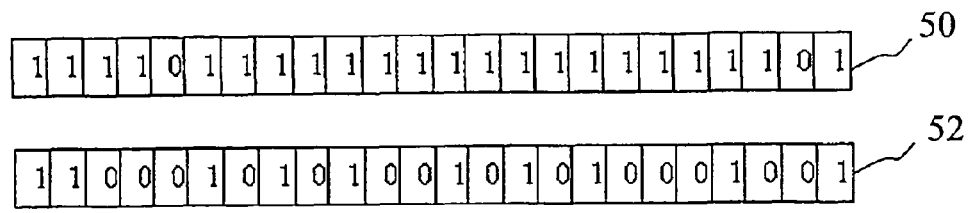
FIGS. 3 and 4 shows examples of multiframes each comprising 24 VADNest flags.
Figure 4:
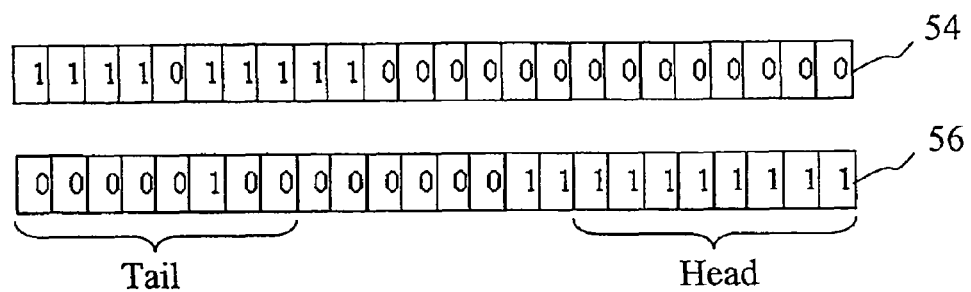

The speech signal is analysed in blocks of 24 frames (240 ms), i.e. in blocks of 24 VADNest flags, each block corresponding to a so-called multiframe. FIGS. 3 and 4 show examples of multiframes made of 24 VADNest flags. As a general rule, a multiframe is considered as useful speech if the occurrences of flags set to one are greater than an appropriate threshold. With a threshold set to 18, the multiframe 50 in FIG. 3 will be considered as speech, while the second multiframe 52 will be marked as noise.

Particular cases of multiframes, such as the ones shown in FIG. 4, are also considered by the VADNest processing 34. In both cases of multiframes 54 and 56, with a VADNest threshold set to 18, the occurrences of flags set to one would be less than this threshold and, therefore, the multiframe would be considered without speech information. Such deduction could be however wrong if the flags set to "1" represent respectively the beginning (head) and the ending (tail) of a speech section.

Figure 5:
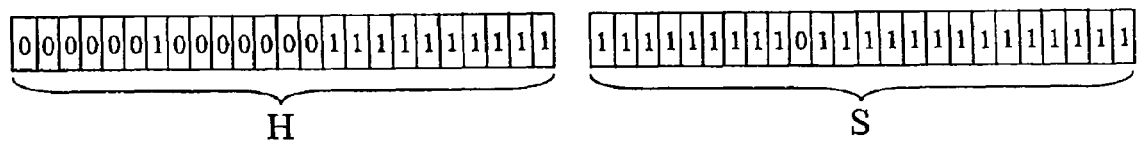
FIG. 5 shows two adjacent multiframes of VADNest flags.

For example, in FIG. 5 the multiframe H on the left, followed by a speech multiframe S on the right, even though having only 11 flags set to "1" is considered as a valid multiframe (to be transmitted) by the VADNest processing 34.

Figure 6:
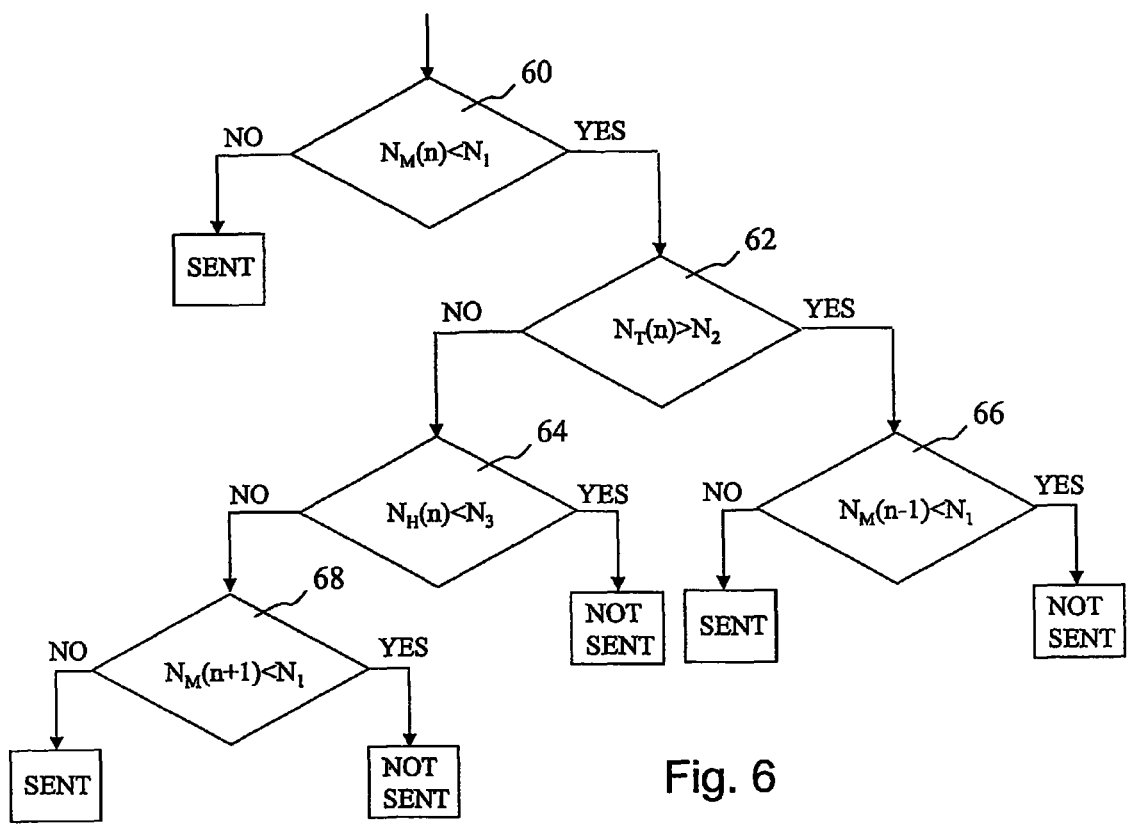
FIG. 6 shows a flow diagram of a method of processing of speech parameters, according to the present invention.

The VADNest processing 34 is shown in detail in the flow diagram of FIG. 6, illustrating the algorithm processing the speech signal a multiframe at a time. The multiframe processed is the $n^{th}$ one.

The following parameters are used in the flow diagram of FIG. 6:

$N_1$=threshold of occurrences of VADNest flags set to one in the multiframe.

$N_M$=occurrences of VADNest flags set to one in the multiframe.

$N_2$=threshold of occurrences of VADNest flags set to one on the left of the multiframe.

$N_T$=occurrences of VADNest flags set to one on the left of the multiframe (Tail multiframe); where the "left" of the multiframe is intended as a first set of frames in the multiframe (e.g. the first 8 frames in a multiframe made of 24 frames).

$N_3$=threshold of occurrences of VADNest flags set to one on the right of the multiframe.

$N_H$=occurrences of VADNest flags set to one on the right of the multiframe (Head multiframe); where the "right" of the multiframe is intended as a last set of frames in the multiframe (e.g. the last 8 frames in a multiframe made of 24 frames).

The process shown in FIG. 6 starts in a first decision block 60, wherein the number $N_M(n)$ of VADNest flags set to one in the current multiframe n is compared with a first predetermined threshold $N_1$ of occurrences of flags set to one in a multiframe. If it is greater than the threshold $N_1$ the multiframe n is sent (marked "SENT"), otherwise the process proceeds in block 62.

In decision block 62 the number $N_T(n)$ of VADNest flags on the left (tail) of the multiframe n is compared with a second predetermined threshold $N_2$. If it is greater than the threshold $N_2$ the process proceeds in block 66, otherwise in block 64.

In decision block 66 it is considered the number $N_M(n-1)$ of VADNest flags set to one in the preceding multiframe n−1, that is compared with the first predetermined threshold $N_1$, i.e. a check is made whether the preceding multiframe was a speech multiframe. If the current multiframe n is subsequent to a speech multiframe n−1, it is considered a "Tail" multiframe, and is sent (marked "SENT"), otherwise it is not sent (marked "NOT SENT").

In decision block 64 the number $N_H(n)$ of VADNest flags on the right of the multiframe n is compared with a third predetermined threshold $N_3$. If it is lower than the threshold $N_3$ the multiframe n is not sent (marked "NOT SENT"), otherwise the process proceeds in block 68.

In decision block 68 it is considered the number $N_M(n+1)$ of VADNest flags set to one in the subsequent multiframe n+1, that is compared with the first predetermined threshold $N_1$, i.e. a check is made whether the subsequent multiframe is a speech multiframe. If the current multiframe n is adjacent to a following speech multiframe n+1, it is considered a "Head" multiframe, and it is sent (marked "SENT"), otherwise it is not sent (marked "NOT SENT").

The VADNest processing 34 previously described is used, as said above, in normal noise conditions, on the contrary, if the background noise energy is over the threshold set in block 32, an alternative energy processing 38 is performed. This alternative processing is preferable in strong noise conditions because of possible saturation of the VADNest flags (all flags set to one).

The energy processing 38 operates according to the same algorithm shown in FIG. 6 and previously described, provided that, for each frame, an energy flag is computed by comparing the frame energy FE with an energy threshold. The result is a frame flag set to "1" if the frame energy is greater than that threshold, "0" otherwise. The algorithm of FIG. 6 is then applied to multiframes of frame energy flags in the same way as previously described with reference to the VADNest flags, in order to obtain a coherent speech windowing based on the energy. The result is an alternative voice activity estimation for the multiframes.

The energy threshold is computed by applying a multiplicative coefficient to the background noise average energy estimation made on the initial multiframes of the speech signal. Experimentally, it has been noticed that a DSR system performs a good recognition if the averaged speech energy is at least five times greater than the background noise average energy. In other words the Frame Energy parameter is compared with the quintuple of the background noise average energy.

The Applicant has observed that, considering a multiframe of 24 frames, good performances can be obtained by setting the parameters involved in the algorithm shown in FIG. 6 as follows:

$$N_1=18$$

$$N_2=6$$

$$N_T=2$$

$$N_3=5$$

$$N_H=7$$

The multiframe 56 in FIG. 4, for example, having eleven flags set to "1", of which eight in the Head portion and one in the Tail portion, will would not be considered as speech except when the following multiframe has a number of flags set to one greater than 18. In that case, in fact, this multiframe represents the beginning of a speech section.

The thresholds $N_1$, $N_2$, $N_3$, $N_H$ and $N_T$ are, in general, optimised by simulation in a preliminary tuning phase of the system. The values used in the afore mentioned example are related to a possible implementation.

The processing made on multiframes produces therefore four types of multiframe according to the voice activity/energy information.

Multiframe type "0": This multiframe does not contain speech information and it won't be transmitted because the number of flags set to one is lower than the threshold $N_1$.

Multiframe type "1": This multiframe is related to a speech section because the number of flags set to one is greater than the threshold $N_1$ and, therefore, it will be transmitted.

Multiframe type "2": This kind of multiframe has a number of tail flags ($N_3$) greater than a specific tail threshold ($N_T$). This could be the ending of a speech section whether the previous multiframe is a multiframe type "1". Only in this case the current multiframe will be transmitted.

Multiframe type "3": This kind of multiframe has a number of head flags ($N_2$) greater than a specific head threshold ($N_H$). This could be the beginning of a speech section whether the following multiframe is a multiframe type "1". In this case this multiframe will be transmitted.

The markers "SENT"/"NOT SENT" associated to each multiframe by the VADNest processing 34 or by the energy processing 38 are passed to the decision block 20, through the signal line MK, which selects the portions of the input speech signal that do not contain speech information.

Figure 7:
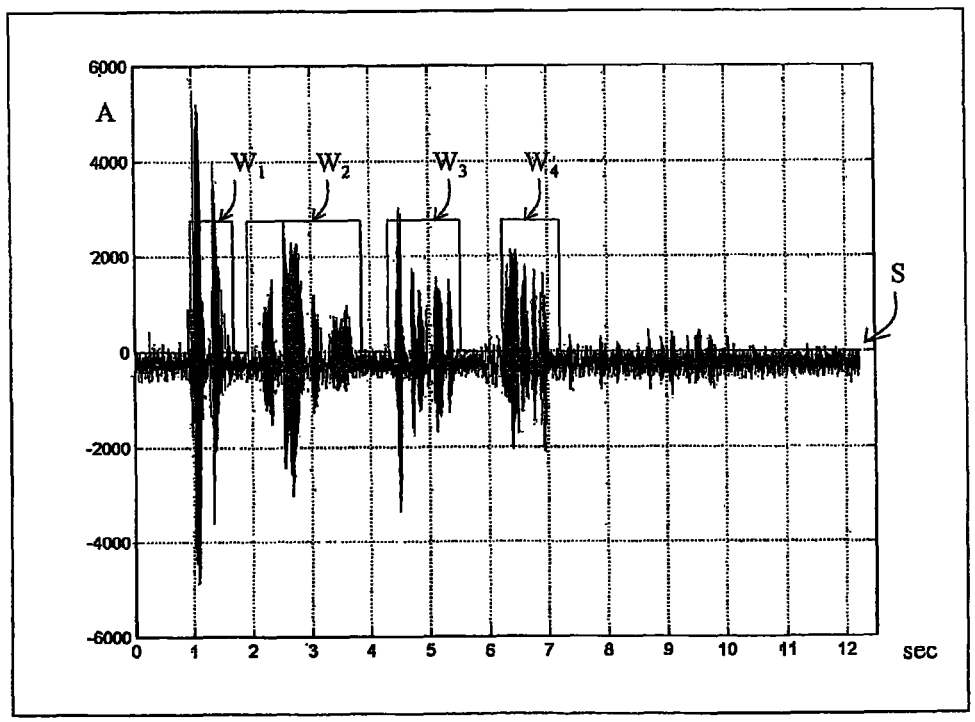
FIG. 7 shows a windowing of a voice activity detection on a speech signal, obtained according to the present invention.

FIG. 7 shows an example of the results of the VADNest processing on a portion of a speech signal S, the X axis representing the time and the Y axis representing the amplitude A of the signal. Four windows $W_1$, $W_2$, $W_3$, $W_4$, shown in FIG. 7 as rectangles surrounding portions of the speech signal, have been detected by the system, corresponding to portions of bitstream that are sent to the back-end. An efficient separation between voiced and unvoiced segments of the input signal is therefore obtained, allowing a considerable traffic reduction and, in particular noise conditions, also increasing the recognition scores. In fact, the eliminated sections, generally not related to the main speaker, could, in some cases, seriously compromise the recognition.

The invention claimed is:

1. A method of transmitting speech data to a remote device in a distributed speech recognition system, comprising:
dividing an input speech signal into frames;
calculating, for each frame, a voice activity value representative of the presence of speech activity in said frame; and
grouping said frames into multiframes, each multiframe comprising a predetermined number of consecutive frames corresponding to the smallest transmission unit transferred to said remote device; comprising the steps of:
calculating, for each multiframe, a voice activity marker representative of the number of frames in said multiframe having a voice activity value representing speech activity, said voice activity marker being indicative of speech activity in said multiframe;
comparing the number of frames representing speech activity in a current multiframe with a first threshold;
selectively transmitting the current multiframe to said remote device on the basis of said voice activity marker associated with the current multiframe, if the number of frames representing speech activity in the current multiframe is greater than or equal to said first threshold indicative of speech activity; and
if the number of frames representing speech activity in the current multiframe is less than said first threshold, comparing a plurality of frames in at least one of a tail portion and a head portion of the current multiframe with a second threshold indicative of speech activity,
wherein said second threshold is less than said first threshold, and
wherein said plurality of frames is less than the total number of frames in the current multiframe, and
selectively transmitting the current multiframe to said remote device if the number of frames representing speech activity in the plurality of frames is greater than or equal to said second threshold indicative of speech activity.

2. The method of claim 1, wherein comparing a plurality of frames in at least one of a tail portion and a head portion of the current multiframe with a second threshold indicative of speech activity comprises:
comparing the number of frames representing speech activity in said tail portion of the current multiframe with said second threshold; and
if the number of frames representing speech activity in said tail portion is greater than said second threshold, performing the steps of:
associating a first value with the marker of said current multiframe, indicative of speech activity, if a multiframe immediately preceding the current multiframe had associated therewith a marker of the first value; and
associating a second value with the marker of said current multiframe, indicative of no speech activity, if said multiframe immediately preceding the current multiframe had associated therewith a marker of the second value.

3. The method of claim 2, further comprising, if the number of frames representing speech activity in said tail portion is lower than or equal to said second threshold:
comparing the number of frames representing speech activity in said head portion of the current multiframe with a third threshold; and
if the number of frames representing speech activity in said head portion is lower than said third threshold, associating a second value with the marker of said current multiframe, indicative of no speech activity.

4. The method of claim 3, comprising, in case the number of frames representing speech activity in said head portion is greater than or equal to said third threshold, the steps of:
associating a first value with the marker of said current multiframe, indicative of speech activity, if a multiframe immediately subsequent to the current multiframe has associated therewith a marker of the first value; and
associating a second value with the marker of said current multiframe, indicative of no speech activity, if said multiframe immediately subsequent to the current multiframe has associated therewith a marker of the second value.

5. The method of claim 4, wherein each multiframe comprises 24 frames, of which 8 initial frames represent said tail portion and 8 last frames represent said head portion.

6. The method of claim 1, wherein said voice activity value is a voice activity detection flag computed on every speech frame of said input speech signal.

7. The method of claim 1, comprising a step of:
calculating a background noise average energy on a plurality of initial multiframes of said input speech signal;
comparing said background noise average energy with a background noise energy threshold; and
if said background noise average energy is below said background noise energy threshold, setting, as said voice activity value, a voice activity detection flag computed on every speech frame of said input speech signal.

8. The method of claim 7, comprising, in case said background noise average energy is over said background noise energy threshold, the steps of:
calculating, for each frame, a frame energy representative of the energy of the corresponding portion of the input speech signal;

comparing said frame energy with an energy threshold, setting a frame energy flag to the value "1" if said frame energy is over said energy threshold and to the value "0" otherwise; and setting, as said voice activity value, said frame energy flag.

9. The method of claim 8, wherein said energy threshold is computed by applying a multiplicative coefficient to said background noise average energy.

10. A distributed speech recognition-system comprising a front-end module for performing processing of a speech signal and a back-end module for carrying out recognition on said processed speech signal, said front-end module being capable of operating according to the method of claim 1.

11. A non-transitory computer-readable storage medium having stored thereon a program comprising software code portions capable of performing, when the computer program is run on a speech recognition system, the method of claim 1.

12. A user terminal comprising a front-end module of a speech recognition system distributed over a communications network, said front-end module comprising:
   a feature extraction block configured to divide an input speech signal into frames, and configured to calculate, for each frame, a voice activity value representative of the presence of speech activity in said frame;
   a bitstream formatting block configured to group said frames into multiframes, each multiframe comprising a predetermined number of consecutive frames corresponding to the smallest transmission unit transferred from said front-end module to a remote back-end module of said distributed speech recognition system;
   a marker block configured to calculate, for each multiframe, a voice activity marker representative of the number of frames in said multiframe having a voice activity value representing speech activity, said voice activity marker being indicative of speech activity in said multiframe; and
   a decision block configured to compare the number of frames representing speech activity in a current multiframe with a first threshold and to selectively transmit the current multiframe on the basis of said voice activity marker associated with the current multiframe over said communications network to the remote back-end module of said distributed speech recognition system, if the number of frames representing speech activity in the current multiframe is greater than or equal to said first threshold indicative of speech activity, and if the number of frames representing speech activity in the current multiframe is less than said first threshold, said decision block further configured to compare a plurality of frames in at least one of a tail portion and a head portion of the current multiframe with a second threshold indicative of speech activity,
   wherein said second threshold is less than said first threshold, and
   wherein said plurality of frames is less than the total number of frames in the current multiframe, and
   said decision block further configured to selectively transmit the current multiframe to said remote device if the number of frames representing speech activity in the plurality of frames is greater than or equal to said second threshold indicative of speech activity.

13. The user terminal of claim 12, wherein said decision block is further configured to eliminate bitstream regions corresponding to the multiframes having associated therewith a marker indicating no speech activity.

14. The user terminal of claim 13, wherein said decision block is further configured to renumber the transmitted multiframes in order to provide the remote back-end module with a coherent bitstream.

15. The user terminal of claim 13, wherein said marker block comprises a module configured to calculate a background noise average energy on a plurality of initial multiframes of said input speech signal, and to compare said background noise average energy with a background noise energy threshold.

16. The user terminal of claim 15, wherein, if said background noise average energy is below said background noise energy threshold, said voice activity value is a voice activity detection flag computed by said feature extraction block on every speech frame of said input speech signal.

17. The user terminal of claim 15, wherein, if said background noise average energy is over said background noise energy threshold, said voice activity value is a frame energy flag obtained, for each frame, by comparing a frame energy, computed by said feature extraction block and representative of the energy of a corresponding portion of the input speech signal, with an energy threshold, and setting said frame energy flag to the value "1" if said frame energy is over said energy threshold and to the value "0" otherwise.

* * * * *